M. CONTI.
CORN STRIPPING AND HUSKING MACHINE.
APPLICATION FILED NOV. 29, 1920.
1,410,168. Patented Mar. 21, 1922.
3 SHEETS—SHEET 1.
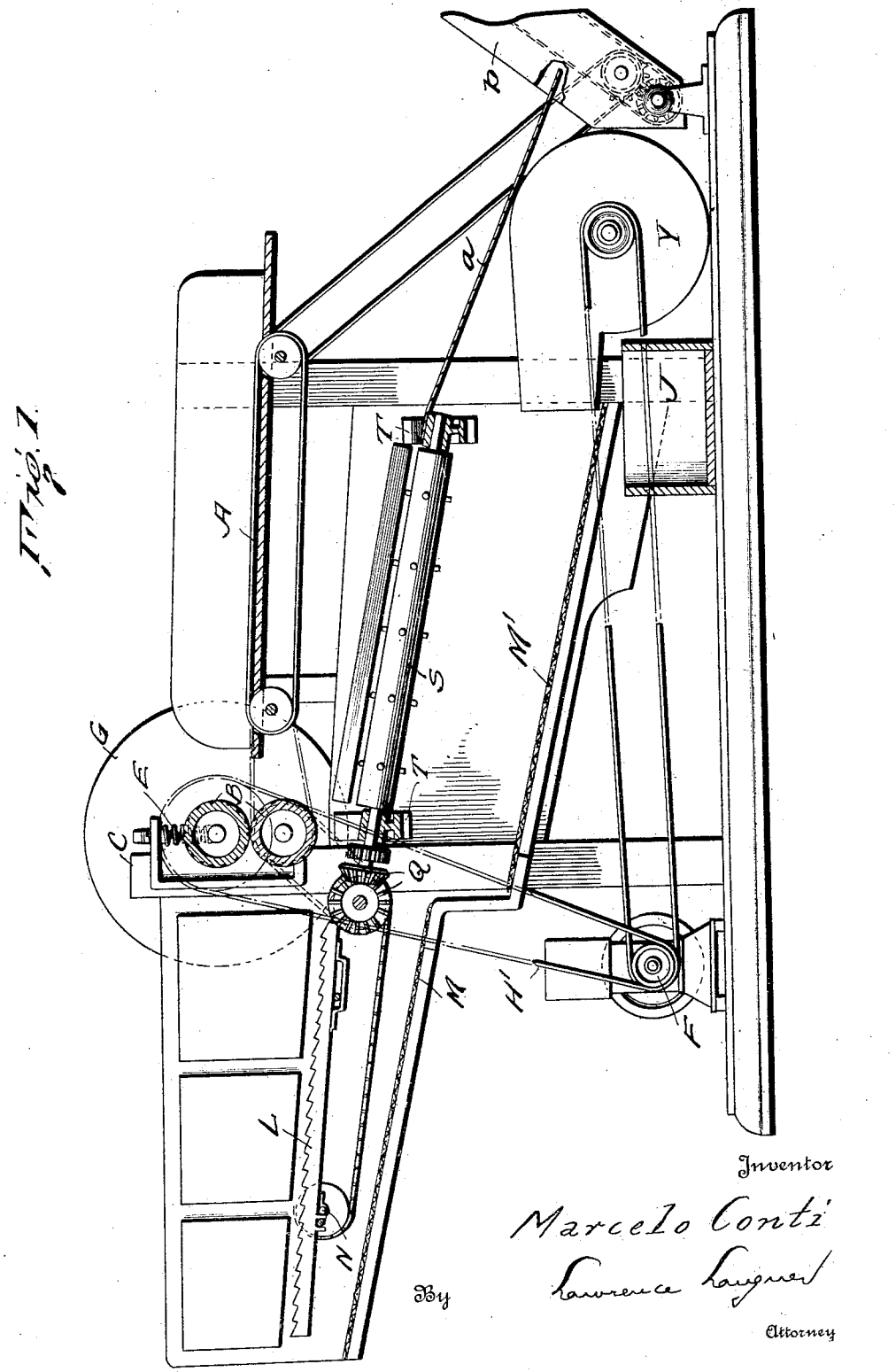

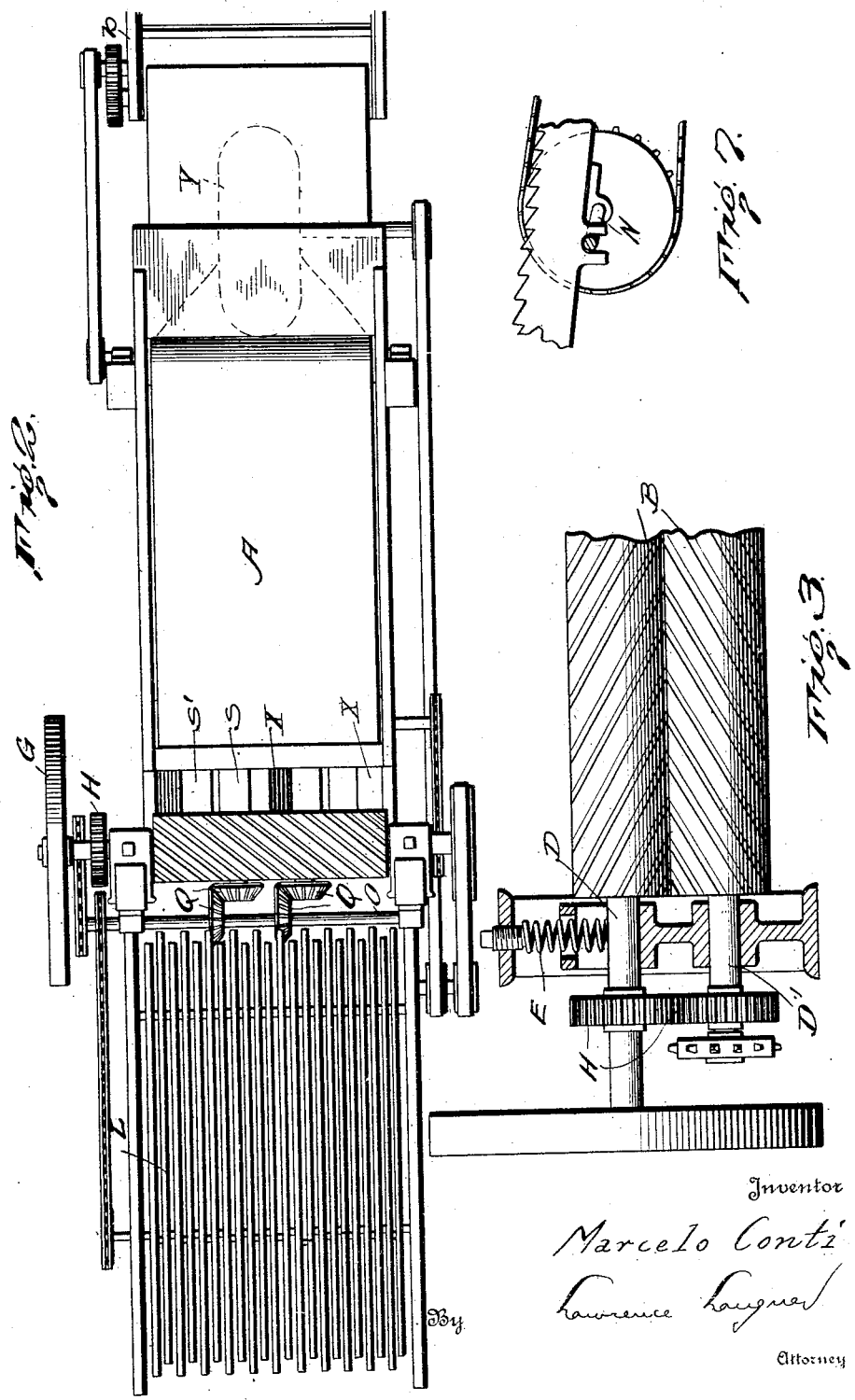

M. CONTI.
CORN STRIPPING AND HUSKING MACHINE.
APPLICATION FILED NOV. 29, 1920.
1,410,168.
Patented Mar. 21, 1922.
3 SHEETS—SHEET 3.
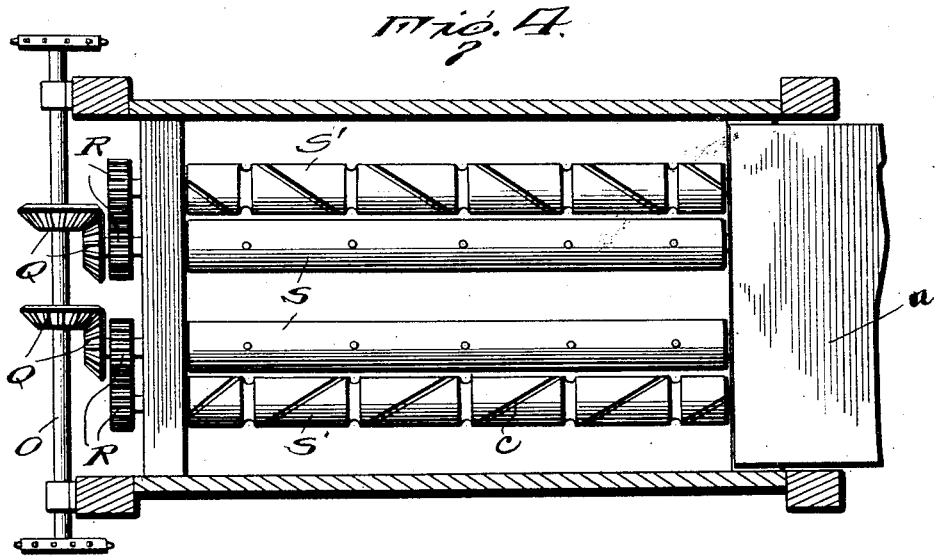
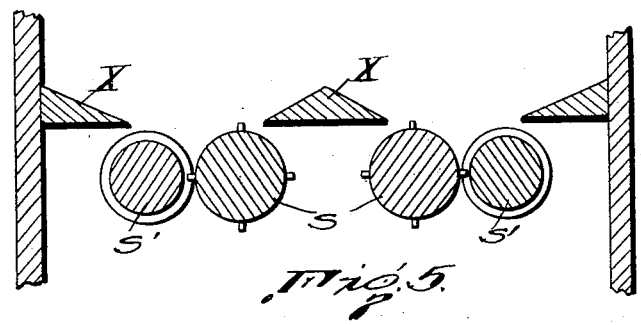
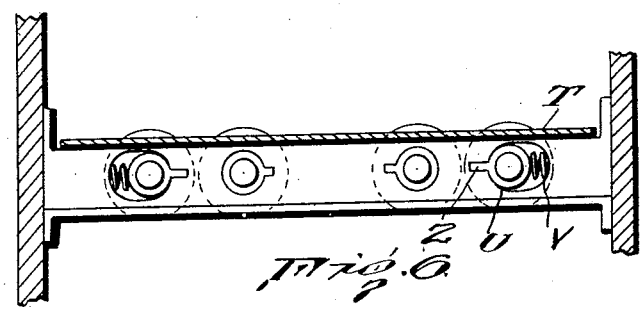
Inventor
Marcelo Conti
By Lawrence Langner
Attorney

UNITED STATES PATENT OFFICE.

MARCELO CONTI, OF BUENOS AIRES, ARGENTINA.

CORN STRIPPING AND HUSKING MACHINE.

1,410,168. Specification of Letters Patent. Patented Mar. 21, 1922.

Application filed November 29, 1920. Serial No. 427,106.

*To all whom it may concern:*

Be it known that I, MARCELO CONTI, a subject of the King of Italy, and resident of Buenos Aires, in the Republic of Argentina, have invented certain new and useful Improvements in Corn Stripping and Husking Machines, of which the following is a specification.

This invention relates to a corn stripping and husking machine and substantially has for object an improved device for stripping the unhusked ears from the corn stalks and separating the husks from the cobs, after the stalks having previously been cut on the field by means of any suitable device, or by hand.

In order that the invention may clearly be understood and carried into practice without difficulty, a preferred form of construction has been shown, by way of example, in the accompanying drawings, wherein:

Figure 1 represents a substantially diagrammatic side elevation of a corn stripping and husking machine constructed in accordance with this invention.

Fig. 2 is a top plan of the same.

Figure 3 shows a detail view of the end part of the stripping rollers.

Figure 4 is an upper plan view of the husking rollers.

Figure 5 illustrates a cross section of the husking rollers and

Figure 6 represents an end view of the same.

Figure 7 is a detail of the means for conveying the cornstalks.

In all figures, the same signs of reference have been used to indicate similar or corresponding parts.

The machine according to this invention substantially consists of a platform or endless conveyor A on which are placed the corn stalks which are thus directed towards the stripping rollers B, arranged to rotate in opposite directions. The two rollers or cylinders B, preferably provided with helical grooves extending in inverse directions one with regard to the other, are mounted with their axles on two supporting pieces provided with oscillatory roller bearings, shown in detail in Figure 2. Said supporting pieces are bolted to the standard C and are provided with two openings through which pass the two roller bearings D, D'. The opening corresponding to the upper bearing, is of oval shape as may be seen in Figure 1, such arrangement allowing of the roller having certain play in a vertical direction, being resiliently held against the lower roller by the action of a spring E, arranged at both sides. The pulley F (Figure 1) receives motion from a suitable motor, a fly wheel G having been provided for steadying motion and keeping up a constant speed. Two cylindrical gears H engage with the two rollers B and the sprocket H' engages with a belt whereby motion is imparted to the husking rollers, later to be described.

The stalks from which the unhusked ears have already been stripped, pass between the separators L and are shaken so as to separate therefrom any grain which may have been detached, by means of a screening box M to which a suitable oscillatory motion is imparted by means of a crank N, operated by a chain gear.

The shaft O, to which motion is imparted by means of the sprocket wheels H and P (Figures 1 and 4), operates in turn the husking rollers S, S' by means of the bevel gears Q and the straight or cylindrical gears R. The husking rollers which may be arranged in number of two or more pairs, assume a longitudinally inclined position and their axles are mounted in oscillatory roller bearings suitably supported by the brackets T, as may be seen in the detail view of Figure 6. One end of the four openings provided in the brackets T for the bearings U is of oval shape, so as to allow of a certain amount of play, and a spring V, conveniently enclosed, is provided for the purpose of maintaining in contact and under pressure each pair of husking rollers. At each bearing is provided a suitable stop Z which fits within a corresponding opening or recess, in order to prevent the rotation of the bearing with the axles of the rollers.

One of each pair of husking rollers S, S' is plain, but is provided with three or four circumferential rows of pegs which coincide with an even number of grooves formed in a corresponding position on the periphery of the opposite roller, and within said grooves is also provided a series of pegs or teeth which the same as the former, are for the purpose of engaging with the tearing off the husks without deteriorating the cobs. The cobs are guided towards the middle between each pair of rollers by means of the triangular wooden battens X, as may clearly be seen in Figure 6, when the said cobs fall away from the stripping rollers.

The husks of the husked ears pass downwards below the rollers, being drawn along by the pegs and fall into the lower screening box M from which they are thrown out by the air blast furnished by the ventilator Y. In order to facilitate the conveyance of the cobs along the husking rollers, the sections of roller S' are provided each with a helical groove c leading into the annular grooves at the ends of the section, which aids to work the cobs towards the discharge end where they fall onto a chute a, whence the cobs are passed to the lower end of an elevator b of any convenient construction. The chute may suitably consist of an inclined trough of sheet metal and the elevator may convey the cobs to the granary or to a cart for charging or bagging the same.

The drive of the ventilator Y and the elevator b is conveniently obtained by means of ordinary gears and chains and a detailed description of the same is deemed unnecessary.

The operation of the machine according to this invention does not require any particular description, as the same will readily be understood from the foregoing explanations.

The corn stalks are placed onto the charging platform whence they will be conveyed by the endless carrier A towards and between the stripping rollers B, between which the unhusked ears are torn off and caused to fall on the husking rollers S, while the stalks and detached husks are discharged onto the conveying screen L; the separated grain will pass to the lower screening box M, M' from which it is discharged into the receptacle J. The husks fall between the husking rollers S onto the screen M' from which they are expelled by the ventilator Y. The husked ears slide over the husking rollers and are guided by the chute a to the lower end of the elevator b. The conjoint of the machine may be mounted on any suitable supporting frame, preferably without wheels.

It will be understood that several modifications of construction and detail may be introduced, without departing from the spirit and limits of the invention which will clearly be determined in the following claiming clause.

Having now described my invention, I declare that what I claim and desire to secure by Letters Patent, is:

In a corn stripping and husking machine, a pair of husking rollers, one of said rollers having a smooth surface and being provided with a plurality of circumferential rows of pegs, the other of said rollers being provided with annular grooves opposite said rows of pegs, the sections of the grooved roller between said annular grooves being provided each with a helical groove.

Signed at Buenos Aires, Republic of Argentine, this 14th day of October, A. D. 1920.

MARCELO CONTI.